United States Patent
Steffensen et al.

(10) Patent No.: US 12,180,930 B2
(45) Date of Patent: Dec. 31, 2024

(54) DETERMINING A FREQUENCY OF AN OSCILLATING MOVEMENT OF A WIND TURBINE TOWER

(71) Applicant: Siemens Gamesa Renewable Energy A/S, Brande (DK)

(72) Inventors: Henrik Steffensen, Århus (DK); Carl Lund Richter, Lejre (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 9 days.

(21) Appl. No.: 17/800,015

(22) PCT Filed: Jan. 21, 2021

(86) PCT No.: PCT/EP2021/051261
§ 371 (c)(1),
(2) Date: Aug. 16, 2022

(87) PCT Pub. No.: WO2021/170315
PCT Pub. Date: Sep. 2, 2021

(65) Prior Publication Data
US 2023/0076193 A1     Mar. 9, 2023

(30) Foreign Application Priority Data
Feb. 25, 2020   (EP) ..................... 20159313

(51) Int. Cl.
F03D 17/00     (2016.01)
F03D 7/02      (2006.01)

(52) U.S. Cl.
CPC .......... *F03D 17/00* (2016.05); *F03D 7/0296* (2013.01); *F05B 2270/327* (2013.01); *F05B 2270/334* (2013.01); *F05B 2270/807* (2013.01)

(58) Field of Classification Search
CPC .............................. F03D 7/0298; F03D 17/00
See application file for complete search history.

(56) References Cited

U.S. PATENT DOCUMENTS

| | | | |
|---|---|---|---|
| 10,934,997 B2 * | 3/2021 | Egedal | F03D 7/0296 |
| 11,300,107 B2 * | 4/2022 | Hawkins | F03D 7/0276 |

(Continued)

FOREIGN PATENT DOCUMENTS

| | | |
|---|---|---|
| CN | 106460790 A | 2/2017 |
| EP | 2 426 352 A2 | 3/2012 |

(Continued)

OTHER PUBLICATIONS

International Search Report and Written Opinion for PCT/EP2021/051261, issued on May 14, 2021.

*Primary Examiner* — Christopher R Legendre
(74) *Attorney, Agent, or Firm* — Schmeiser, Olsen & Watts LLP

(57) ABSTRACT

A method of determining a frequency of an oscillating movement of a wind turbine tower. The wind turbine tower includes a nacelle and a generator including a stator and a rotor, the oscillating movement causing a rolling movement of the nacelle, the method including obtaining a first signal indicative of rotor speed relative to the nacelle, obtaining a second signal indicative of rotor speed relative to ground, determining a first amplitude spectrum based on the first signal, determining a second amplitude spectrum based on the second signal, determining a difference function based on the first amplitude spectrum and the second amplitude spectrum, and determining the frequency of the oscillating movement of the wind turbine tower as a frequency corresponding to a peak in the difference function. A device for determining a frequency of an oscillating movement.

14 Claims, 3 Drawing Sheets

(56) References Cited

U.S. PATENT DOCUMENTS

2014/0339827 A1    11/2014   Esbensen et al.
2017/0037832 A1     2/2017   Friedrich et al.
2023/0076193 A1*   3/2023   Steffensen .............. F03D 17/00

FOREIGN PATENT DOCUMENTS

| EP | 2803853 A1 | 11/2014 |
| --- | --- | --- |
| EP | 3 505 754 A1 | 7/2019 |
| EP | 3505755 A1 | 7/2019 |
| EP | 3591218 A1 | 1/2020 |
| WO | 02/075153 A1 | 9/2002 |
| WO | 2017092773 A1 | 6/2017 |
| WO | 2018/077530 A1 | 5/2018 |

* cited by examiner

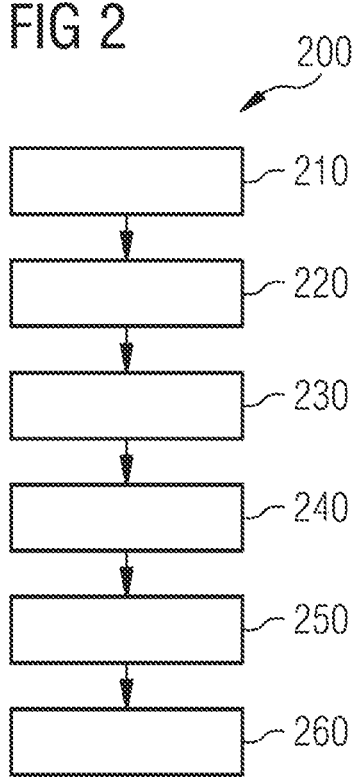
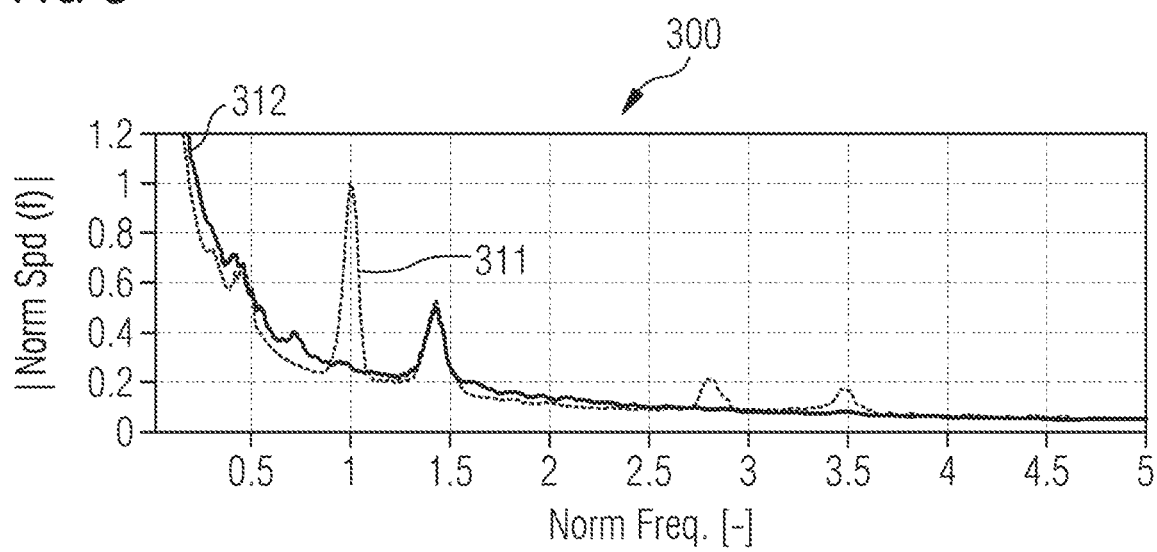

DETERMINING A FREQUENCY OF AN OSCILLATING MOVEMENT OF A WIND TURBINE TOWER

CROSS-REFERENCE TO RELATED APPLICATIONS

This application claims priority to PCT Application No. PCT/EP2021/051261, having a filing date of Jan. 21, 2021, which claims priority to EP Application No. 20159313.4, having a filing date of Feb. 25, 2020, the entire contents both of which are hereby incorporated by reference.

FIELD OF TECHNOLOGY

The following relates to the field of wind turbines, in particular to a method of determining a frequency of an oscillating movement of a wind turbine tower, the wind turbine tower carrying a nacelle and a generator including a stator and a rotor, the oscillating movement causing a rolling movement of the nacelle. The following further relates to a device for determining a frequency of an oscillating movement of a wind turbine tower, to a wind turbine comprising such a device, and to a computer program.

BACKGROUND

A wind turbine comprises many different structural components, all having specific frequencies at which they naturally oscillate. These are called natural frequencies or frequency modes.

When controlling a wind turbine, it can be very useful to know these frequencies, for example in order to (a) avoid exciting these structural modes, e.g., causing excessive loads on the structure, and (b) actively damp a mode which is known to cause problems related to loads or other control objectives.

The natural frequencies can be estimated on the basis of mathematical models of the wind turbine structure. However, such estimates suffer from the need for approximations and for making assumptions. Furthermore, the estimates cannot take into consideration that some conditions and parameters may change during the lifetime of a wind turbine. For example, the composition of the underground may change, or the mechanical properties of the wind turbine structural elements may change or vary due to varying environmental conditions, such as extreme heat or cold.

Accordingly, there may be a need for a way of determining current frequencies of oscillating wind turbine tower movement in a simple and precise manner.

SUMMARY

An aspect relates to a method of determining a frequency of an oscillating movement of a wind turbine tower, the wind turbine tower carrying a nacelle and a generator including a stator and a rotor, the oscillating movement causing a rolling movement of the nacelle. The method comprises (a) obtaining a first signal indicative of rotor speed relative to the nacelle, (b) obtaining a second signal indicative of rotor speed relative to ground, (c) determining a first amplitude spectrum based on the first signal, (d) determining a second amplitude spectrum based on the second signal, (e) determining a difference function based on the first amplitude spectrum and the second amplitude spectrum, and (f) determining the frequency of the oscillating movement of the wind turbine tower as a frequency corresponding to a peak in the difference function.

This aspect of embodiments of the invention are based on the idea that the rotor speed measured relative to the nacelle will contain a superimposed oscillation caused by the rolling movement of the nacelle, which will not be present in a rotor speed measured relative to ground. Thus, when forming a difference function based on the amplitude spectrums of the two rotor speed measurements, the frequency of the superimposed oscillation will cause a corresponding peak in the difference function. Hence, the frequency of the given oscillation can be determined as the frequency where the difference function exhibits a peak.

In the present context, the term "rolling movement" may in particular denote a movement of the nacelle in the plane of the rotor disc. In other words, the rolling movement will cause a reduction in the rotor speed value represented by the first signal when the nacelle rolls in the direction of rotation of the rotor (i.e., with the rotor). Similarly, the rolling movement will cause an increase in the rotor speed value represented by the first signal when the nacelle rolls in the opposite direction of the rotation of the rotor (i.e., against the rotor).

Embodiments of the invention are capable of providing a precise determination of an actual oscillation frequency (substantially in real time) based on two rotor speed measurements, i.e., without relying on mathematical models and assumptions/estimates of mechanical properties. The two rotor speed measurements (or at least the data necessary for deriving the measurements) are already available in a typical wind turbine. Hence, embodiments of the present invention can be easily implemented without the need for additional hardware.

According to an embodiment of the invention, the oscillating movement of the wind turbine tower is a second mode tower oscillating movement.

The second mode is the one mode which causes the strongest rolling movement of the nacelle (together with a lateral displacement of the nacelle) and which is therefore easiest (and most important) to detect by embodiments of the present invention.

According to a further embodiment of the invention, the difference function is determined as an absolute difference between the first amplitude spectrum and the second amplitude spectrum as a function of frequency.

By calculating the absolute difference between corresponding values of the first and second amplitude spectrums, the determination of peaks in the difference function becomes simpler.

According to a further embodiment of the invention, the method further comprises applying a smoothing to each of the first and second amplitude spectrums before determining the difference function.

By smoothing the amplitude spectrums, any negative influence from measurement errors and other outliers can be significantly reduced.

According to a further embodiment of the invention, the first signal is obtained by a rotor speed sensor arranged within the nacelle and adapted to measure the rotor speed.

In other words, the rotor speed sensor is the device used by any wind turbine to provide input to the wind turbine control system which uses it as a feedback parameter to control the rotor speed to a desired value, e.g., by adjusting the pitch angles of the rotor blades, setting the generator torque, applying braking, etc.

According to a further embodiment of the invention, the rotor speed sensor is an optical or a magnetic sensor adapted to detect when a corresponding part of the rotor passes by the first sensor.

In other words, the rotor speed sensor detects when certain regions or parts of the rotor circumference passes the rotor speed sensor by sensing a corresponding change in optical or magnetic properties. The certain regions or parts are equidistantly displaced along the rotor circumference.

According to a further embodiment of the invention, the second signal is obtained by a monitoring device arranged at a hub of the wind turbine.

The monitoring device may in particular be part of a safety system that monitors a variety of operational parameters of the wind turbine without being involved in the normal control of the wind turbine. The information collected by the monitoring device may in particular be used to detect failures and malfunctions during operation and to schedule maintenance of the wind turbine. In some cases, the monitoring device may not directly measure the rotor speed but instead obtain various data relating to rotor movement that allow for easy derivation of the rotor speed.

According to a further embodiment of the invention, the monitoring device comprises at least one inertial sensor.

The at least one inertial sensor may in particular be useful for obtaining information on rotor movement relative to ground (i.e., relative to the gravitational field of earth).

According to a further embodiment of the invention, the at least one inertial sensor comprises a g-sensor and/or a gyroscope.

According to a further embodiment of the invention, determining the first amplitude spectrum and determining the second amplitude spectrum comprises applying a sliding discrete Fourier transform to the first signal and the second signal, respectively.

In this way, the oscillation frequency is always determined on the basis of the most recent data, such as data corresponding to the last second, the last 10 seconds, the last minute, or any other predetermined time interval.

According to a further embodiment of the invention, the method further comprises confirming the determined frequency as the frequency of the oscillating movement of the wind turbine tower if the peak value of the difference function exceeds a predetermined threshold value.

By requiring the peak value to exceed a predetermined threshold value, it can be assured that random differences between the spectrums do not lead to false frequency determination.

According to a second aspect of embodiments of the invention, there is provided a device for determining a frequency of an oscillating movement of a wind turbine tower, the wind turbine tower carrying a nacelle and a generator including a stator and a rotor, the oscillating movement causing a rolling movement of the nacelle. The described device comprises (a) an interface configured to (aa) receive a first signal indicative of rotor speed relative to the nacelle, and (ab) receive a second signal indicative of rotor speed relative to ground, and (b) a processing unit configured to (ba) determine a first amplitude spectrum based on the first signal, (bb) determine a second amplitude spectrum based on the second signal, (bc) determine a difference function based on the first amplitude spectrum and the second amplitude spectrum, and (bd) determine the frequency of the oscillating movement of the wind turbine tower as a frequency corresponding to a peak in the difference function.

This aspect of embodiments of the invention is substantially based on the same idea as the first aspect discussed above.

According to a third aspect of embodiments of the invention, there is provided a wind turbine comprising a device according to the second aspect.

This wind turbine benefits from the advantages described above in conjunction with the first and second aspects.

According to a third aspect of embodiments of the invention, there is provided a computer program comprising computer executable instructions, which, when executed by a processor, are adapted to perform the steps of the method according to the first aspect or any of the above embodiments thereof.

The computer program may in particular be run on the wind turbine controller. Thus, it may also be installed on existing turbines as a software upgrade.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above, and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION

Some of the embodiments will be described in detail, with reference to the following figures, wherein like designations denote like members, wherein:

FIG. 2 shows a flow diagram of a method according to an embodiment of the present invention;

FIG. 3 shows a plot of two normalized amplitude spectrums determined in conjunction with an embodiment of the present invention;

DETAILED DESCRIPTION

Figure 1:
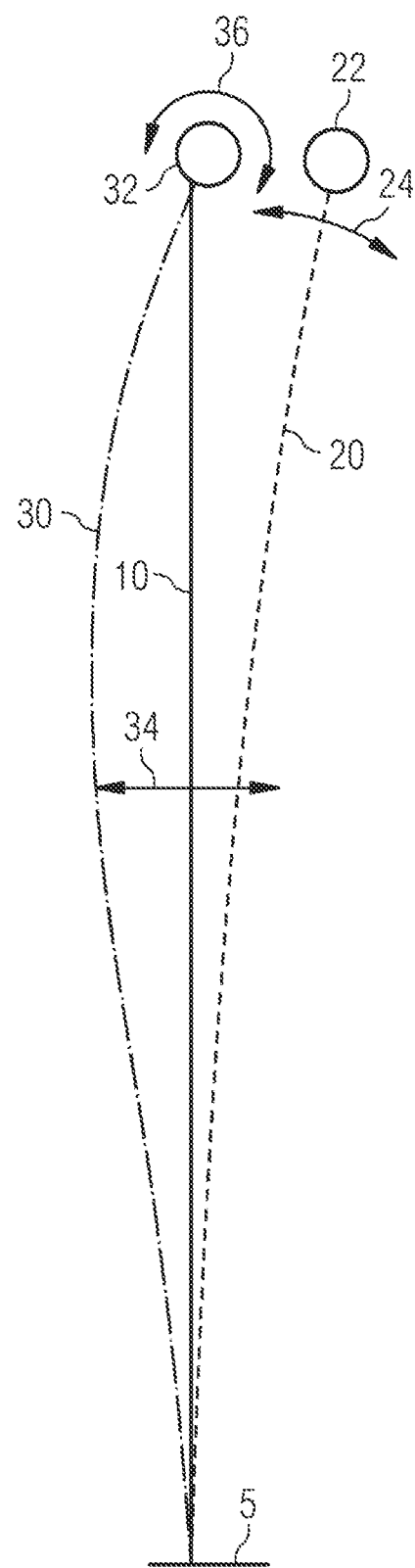
FIG. 1 shows different types of oscillating tower movement.

FIG. 1 shows different types of oscillating tower movement. More specifically, FIG. 1 shows a schematic representation of a wind turbine tower mounted to ground 5 and carrying a nacelle at its top. The wind turbine is viewed from the front such that the rotor axis will be extending perpendicular to the plane of the drawing. When no oscillating (lateral) movement occurs, the tower is standing still and straight up as indicated by the full line 10. When a first mode of oscillating movement occurs, the tower with nacelle 22 will bend from side to side as indicated by the dotted line 20 and arrow 24. When a second mode of oscillating movement occurs, the central section (in the middle between ground 5 and nacelle 32) of the tower with nacelle 32 will move from side to side as indicated by arrow 34. In this mode, the nacelle will not show much lateral movement but instead exhibit a rolling movement (around an axis parallel to the rotor axis) as shown by arrow 36. Hence, when the rotational speed of the rotor is measured by a sensor fastened to the nacelle, the roll movement will influence the measured rotor speed. Therefore, when such a rotor speed measurement is used to set the pitch reference in the wind turbine control system, it may cause increased pitch activity and pitch travel as well as fore-aft tower loads. With precise knowledge of the second mode frequency (and possibly further higher mode frequencies causing a rolling nacelle movement), these drawbacks can be mitigated.

FIG. 2 shows a flow diagram 200 of a method according to an embodiment of the present invention.

At 210, a first signal indicative of rotor speed relative to the nacelle is obtained. This first signal is obtained directly from a rotor speed sensor mounted within the nacelle.

At 220, a second signal indicative of rotor speed relative to ground is obtained. The second signal is obtained directly or indirectly from a monitoring device arranged at a hub of the wind turbine, the monitoring device being part of a security system.

Then, at 230, a first amplitude spectrum is determined based on the first signal, and at 240, a second amplitude spectrum is determined based on the second signal. Both amplitude spectrums are determined by applying a discrete Fourier transformation (DFT) to the first and second signals, in particular a sliding DFT taking only a predetermined amount of the most recent signal values into account, such as the last second, the last 10 seconds, the last minute, etc.

It should be noted that the steps 210, 220, 230, 240 do not need to be performed in the mentioned order.

Next, at 250, a difference function is determined based on the first amplitude spectrum and the second amplitude spectrum. The difference function may in particular be calculated as the absolute difference between the first and second amplitude spectrums as a function of frequency.

Finally, at 260, the frequency of the oscillating movement of the wind turbine tower is determined as a frequency corresponding to a peak in the difference function. Here, to assure robustness in the determination of the frequency, the frequency corresponding to the peak in the difference function may by output as representative of the oscillating frequency only if the peak value exceeds a predetermined threshold value. Furthermore, it may also be required that the determined frequency is within some predetermined interval based on knowledge of the mechanical properties of the wind turbine structure.

FIG. 3 shows a plot 300 of two normalized amplitude spectrums determined in conjunction with an embodiment of the present invention. More specifically, the plot 300 shows a first normalized amplitude spectrum 311 corresponding to a first signal that is indicative of rotor speed relative to the nacelle, and a second normalized amplitude spectrum 312 corresponding to a second signal that is indicative of rotor speed relative to ground, e.g., as determined in steps 230 and 240 of the method 200 discussed above in conjunction with FIG. 2. As can be seen, the spectrums 311, 312 are normalized such that the normalized value of the first spectrum 311 is one at a normalized frequency of one, the latter corresponding to the frequency of the second tower mode.

As can be seen, the amplitude spectrums 311, 312 are very similar for most frequencies. However, at a normalized frequency around 1.0, the first spectrum 311 has a significantly larger value, i.e., 1.0, than the second spectrum 312. Also, at normalized frequencies around 2.8 and 3.5, the first spectrum 311 has larger values than the second spectrum 312.

Figure 4:
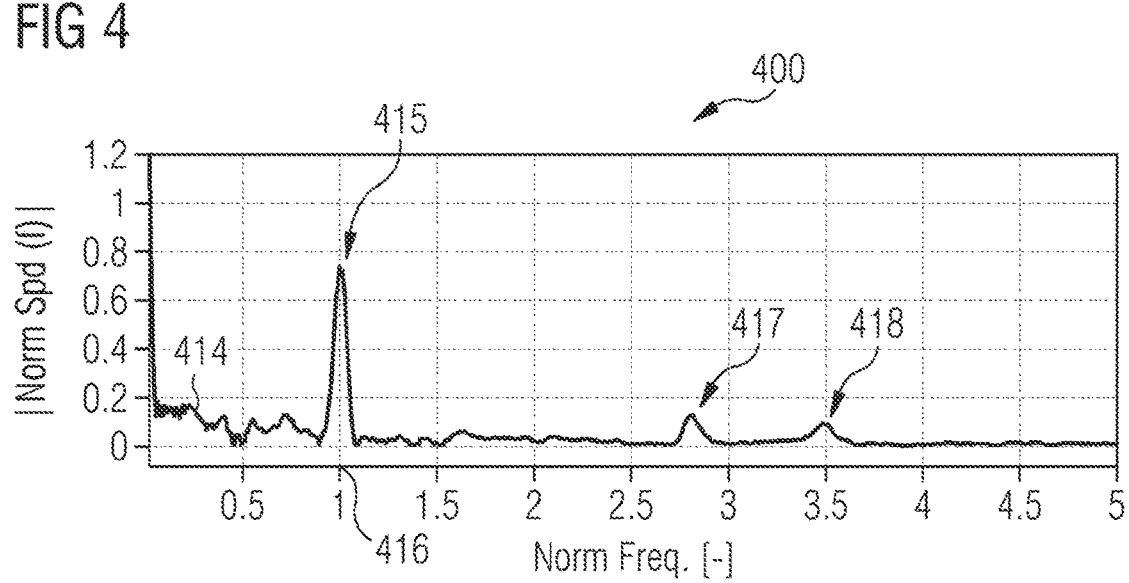
FIG. 4 shows a plot of a difference function determined in conjunction with an embodiment of the present invention.

FIG. 4 shows a plot 400 of a difference function 414 determined in conjunction with an embodiment of the present invention, e.g., in step 250 of the method 200 discussed above in conjunction with FIG. 2. More specifically, the difference function 414 corresponds to the absolute difference between the first normalized amplitude spectrum 311 and second normalized amplitude spectrum 312 shown in FIG. 3 and discussed above.

It is noted that the difference function 414 shows a significant peak 415 at a normalized frequency 416 around 1.0. Furthermore, the difference function 414 shows further and smaller peaks 417 and 418 at a normalized frequency around 2.8 and at another normalized frequency slightly around 3.5.

The major peak 415 will be interpreted as corresponding to the second tower mode as this mode is the first one involving a rolling movement of the nacelle. The other peaks 417 and 418 may be interpreted as corresponding to higher order modes but will usually be disregarded due to their insignificant magnitude.

Figure 5:
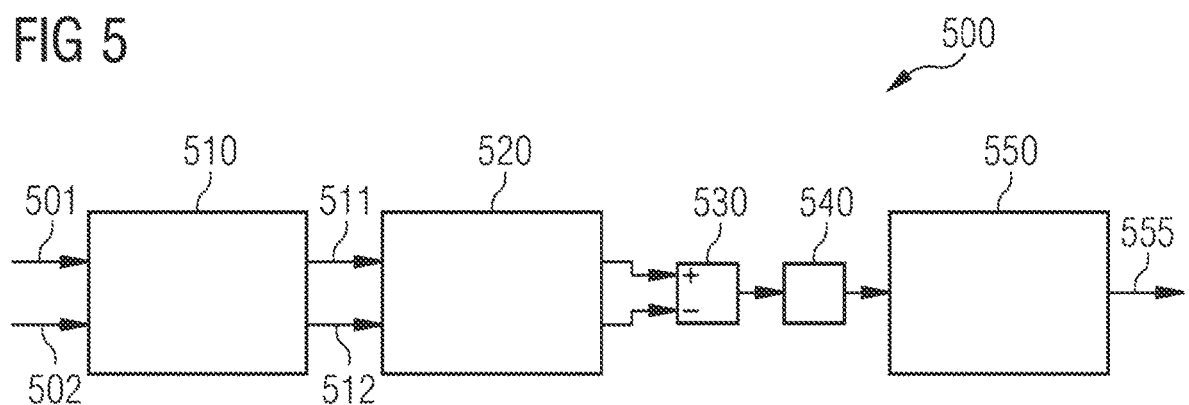
FIG. 5 shows a functional block diagram of a device according to an embodiment of the present invention.

FIG. 5 shows a functional block diagram 500 of a device according to an embodiment of the present invention. The functional blocks of the device comprise a sliding DFT block 510, a smoothing block 520, a difference calculation block 530, an absolute value calculation block 540, and a peak tracking block 550.

The sliding DFT block 510 receives the first rotor speed signal 501 and the second rotor speed signal 502 and outputs corresponding first 511 and second 512 amplitude spectrums to the smoothing block 520. The smoothed spectrums are input to the difference calculation block 530 and the calculated difference is passed on to the absolute value calculation block 540. The absolute difference between the smoothed first and second spectrums is then input to the peak tracking block 550 which identifies one or more peaks in the difference function as discussed above and outputs the corresponding frequency (or frequencies) 555, in particular the frequency of the second tower mode.

Physically, the device may be implemented as an interface and a processing unit. The interface is configured to receive the first signal 501 indicative of rotor speed relative to the nacelle, and to receive the second signal 502 indicative of rotor speed relative to ground. The processing unit is configured to perform the functions of functional blocks 510, 520, 530, 540, 550, i.e. determine a first amplitude spectrum 511 based on the first signal 501, determine a second amplitude spectrum 512 based on the second signal 502, determine an absolute difference function based on the first amplitude spectrum 511 and the second amplitude spectrum 512, and determine the frequency of the oscillating movement of the wind turbine tower as a frequency 555 corresponding to a peak in the absolute difference function. The functional blocks 510, 520, 530, 540, 550 may be implemented as software.

With constant knowledge of the oscillating frequencies, in particular the frequency of the second tower mode, a number of advantages can be obtained, such as reduction of fore-aft tower loads
reduction of pitch bearing loads
reduction of pitch actuation enabling active dampening of (in particular) second tower mode oscillation filtering out the specific frequency in the measurement for the wind turbine controller will prevent the controller from reacting to the frequency and hence reduce loads reducing loads on existing and new turbines It should be emphasized that all these advantages can be obtained without additional hardware, in particular without additional sensors.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a wind turbine having a wind turbine tower, the wind turbine tower carrying a nacelle and a generator including a stator and a rotor, the method comprising:
    determining a frequency of an oscillating movement of the wind turbine tower, the oscillating movement causing a rolling movement of the nacelle, wherein the frequency is determined by:
        obtaining a first signal indicative of a speed of the rotor relative to the nacelle;
        obtaining a second signal indicative of the speed of the rotor relative to ground;
        determining a first amplitude spectrum based on the first signal;
        determining a second amplitude spectrum based on the second signal;
        determining a difference function based on the first amplitude spectrum and the second amplitude spectrum, and
        determining the frequency of the oscillating movement of the wind turbine tower as a frequency corresponding to a peak in the difference function; and
    controlling the wind turbine according to the frequency of the oscillating movement of the wind turbine tower.

2. The method according to claim 1, wherein the oscillating movement of the wind turbine tower is a second mode tower oscillating movement.

3. The method according to claim 1, wherein the difference function is determined as an absolute difference between the first amplitude spectrum and the second amplitude spectrum as a function of frequency.

4. The method according to claim 1, further comprising applying a smoothing to each of the first amplitude spectrum and the second amplitude spectrum before determining the difference function.

5. The method according to claim 1, wherein the first signal is obtained by a rotor speed sensor arranged within the nacelle and configured to measure the speed of the rotor.

6. The method according to claim 5, wherein the rotor speed sensor is an optical or a magnetic sensor configured to detect when a corresponding part of the rotor passes by the first sensor.

7. The method according to claim 1, wherein the second signal is obtained by a monitoring device arranged at a hub of the wind turbine.

8. The method according to claim 7, wherein the monitoring device comprises at least one inertial sensor.

9. The method according to claim 8, wherein the at least one inertial sensor comprises a g-sensor and/or a gyroscope.

10. The method according to claim 1, wherein determining the first amplitude spectrum and determining the second amplitude spectrum comprises applying a sliding discrete Fourier transform to the first signal and the second signal, respectively.

11. The method according to claim 1, further comprising confirming the determined frequency as the frequency of the oscillating movement of the wind turbine tower if the peak value of the difference function exceeds a predetermined threshold value.

12. A controller of a wind turbine having a wind turbine tower, the wind turbine tower carrying a nacelle and a generator including a stator and a rotor, the controller comprising:
    an interface configured to:
        receive a first signal indicative of a speed of the rotor relative to the nacelle, and
        receive a second signal indicative of the speed of the rotor relative to ground, and
    a processing unit configured to:
        determine a first amplitude spectrum based on the first signal,
        determine a second amplitude spectrum based on the second signal,
        determine a difference function based on the first amplitude spectrum and the second amplitude spectrum,
        determine a frequency of an oscillating movement of the wind turbine tower as a frequency corresponding to a peak in the difference function, and
        control the wind turbine according to the frequency of the oscillating movement of the wind turbine tower.

13. A wind turbine comprising a device according to claim 12.

14. A computer program product comprising a non-transitory computer readable medium comprising computer executable instructions, which, when executed by a processor, are configured to perform the steps of the method according to claim 1.

* * * * *